United States Patent [19]

Satoh et al.

[11] Patent Number: 4,774,700
[45] Date of Patent: Sep. 27, 1988

[54] INFORMATION RECORDING AND REPRODUCING APPARATUS WITH DETECTION AND MANAGEMENT OF DEFECTIVE SECTORS

[75] Inventors: Isao Satoh, Neyagawa; Yoshihisa Fukushima, Osaka, both of Japan

[73] Assignee: Matsushita Electric Industrial Co., Ltd., Osaka, Japan

[21] Appl. No.: 837,171

[22] Filed: Mar. 7, 1986

[30] Foreign Application Priority Data

Mar. 12, 1985 [JP] Japan .................... 60-49035

[51] Int. Cl.[4] .............................. G11B 27/36
[52] U.S. Cl. ........................ 369/54; 369/58; 360/53; 360/60
[58] Field of Search ............ 369/53, 54, 58; 360/31, 360/60, 53

[56] References Cited

U.S. PATENT DOCUMENTS

| | | | |
|---|---|---|---|
| 4,214,280 | 7/1980 | Halfhill et al. | 360/60 X |
| 4,507,693 | 3/1985 | Matsuda et al. | 360/72.2 |
| 4,571,216 | 2/1986 | Szerlip | 369/58 X |
| 4,623,994 | 11/1986 | Nabeshima et al. | 369/54 X |

FOREIGN PATENT DOCUMENTS

| | | | |
|---|---|---|---|
| 57-55580 | 4/1982 | Japan | 360/49 |
| 58-3103 | 1/1983 | Japan | 360/31 |
| 58-98806 | 6/1983 | Japan | 369/53 |
| 58-203634 | 11/1983 | Japan . | |
| 59-113509 | 6/1984 | Japan . | |

OTHER PUBLICATIONS

English Translation of JP 58-3103.

*Primary Examiner*—Aristotelis M. Psitos
*Attorney, Agent, or Firm*—Stevens, Davis, Miller & Mosher

[57] ABSTRACT

An information recording and reproduction apparatus for recording and reproduction of information in a recording medium having an information recording area divided into a plurality of sectors, in which a defective sector is replaced for recording and a signal for identifying the defective sector is recorded. Each sector includes a preformatted sector identification section ID and a data field for recording data therein. A defective sector is replaced by a sector at another position. When the sector identification section ID and/or data field DF has a defect, a first signal is recorded in addition to the data in the data field DF, followed by writing a second signal overlapped in the sector identification section ID of the same sector which causes an address data read error thereby to attach a defect mark to the defective sector. By detecting the first signal at the time of recording or reproduction, the sector involved is known to be defective, and at the same time, the data therein is transferred to another (replacement) sector, or a sector is detected where the data is recorded. A defective sector never fails to be identified by the second signal overwritten in the sector identification section ID. A defective sector is thus detected in real time at the time of data recording or reproduction, and therefore the defective sector replacing operation is performed in a minimal access time. Further, the storage capacity has no loss since a defective sector is identified by a signal recorded in the data field section DF.

5 Claims, 10 Drawing Sheets

INFORMATION RECORDING AND REPRODUCING APPARATUS WITH DETECTION AND MANAGEMENT OF DEFECTIVE SECTORS

BACKGROUND OF THE INVENTION

The present invention relates to an information recording and reproducing apparatus for recording and/or reproducing information in a recording medium including an information recording region divided into a plurality of sectors, in which if a sector is defective, information will be recorded in a replacement sector and a signal for identifying the defective sector will be also recorded.

DESCRIPTION OF THE PRIOR ART

A conventional information recording and reproducing apparatus is disclosed in Japanese Patent Publication Laid-Open No. 203634/83 in which whether a recorded piece of information is acceptable or not is determined, and if it is determined as defective, a flag is recorded at the back area of the defective sector. Also, Japanese Patent Publication Laid-Open No. 113509/84 discloses a disc apparatus in which a defective sector is replaced.

FIG. 13 shows a sector format for these conventional discs with identification flags F1 and F2 for a defective sector.

A sector includes a sector identification section ID, a data field section DF and flags F1 and F2 for recording the information as to whether the data field DF is usable or not. FIG. 13 (a) shows an example of recording the flag F1 immediately after the sector identification section ID, and FIG. 13 (b) shows an example of recording the flag F2 at the back area of the data field DF.

The flag F1 or F2 is recorded to indicate whether a particular sector is usable or not as a result of a DRAW (direct read after write) check effected in the data recording in the data field DF or a read verify check after such a recording.

In another method, whether a particular data field DF is acceptable or not is checked in advance, and the result of such a check is recorded as the flag F1 or F2. The former method is used with an optical disc of write-once type and the latter method finds an application in an optical or magnetic disc of re-writable (reversible) type.

In FIG. 13 (a), if the result of a DRAW check indicates an uncorrectable error detected in a recorded data, the flag 1 is written in the next disc rotation. In the case of FIG. 13 (b), on the other hand, the flag F2 is written immediately after data recording. The processing speed is higher in FIG. 13 (b). At the time of data reproduction, the involved data is abandoned upon detection of the flag F1 or F2.

The configuration described above, however, poses the problem of a lower reliability in detecting the flag F1 or F2 with respect to recording media such as optical disc which may often suffer from many defects such as foreign particles in the substrate, a flaw in the disc surface or dust on a preformatted track.

Further, if the recording area of these flags is enlarged for securing the effect of these flags to detect such a defect of the recording medium, the storage capacity of the recording medium is undesirably reduced.

SUMMARY OF THE INVENTION

Accordingly, it is the object of the present invention to provide an information recording and reproducing apparatus which enables in a data recording or reproducing operation a real-time and highly reliable detection of a defective sector with respect to its sector identification section ID as well as a data field section DF thereby making it possible to replace the defective sector within a shorter time.

According to the present invention, there is provided an information recording and reproducing apparatus, wherein in the event that a read error occurs in the identification data of the sector identification section ID of a sector, or the data field DF includes a dropout exceeding a predetermined reference level, or in the event with an erasable recording medium that a data error exceeding a predetermined amount is detected by recording a test data and reading the same by a read-verify check, then the particular sector is discriminated as defective, so that a first signal is caused to be written in the data field FD in the particular sector and subsequently a second signal is caused to be overwritten in the identification section ID thereof. Any sector thus written with the first and second signals will hereinafter be called a defect-mark bearing sector.

In the case of access to a defect-mark bearing sector in data recording operation, a read error of the identification data never fails to occur since the second signal is overwritten in the identification section ID. As a result, the particular sector cannot be detected, so that the laser beam from the optical head passes the identification section ID and reproduces the data field DF. The first signal recorded in the data field DF is thus reproduced. Upon detection of the first signal, the data in this sector is recorded in a replacement sector in a replacement sector area.

The replacement sector area includes a replacement sector arranged in the same track as the defective sector and a replacement track disposed at a predetermined place of the disc for relieving the replacement sector of an over-flow. The first signal has a positional address data for the replacement sector.

In the case of access to a defect-mark bearing sector in data reading operation, a read error of the identification data occurs since the second signal is overwritten in the identification section ID. For this reason, the particular sector fails to be detected, and the laser beam from the optical head passes the identification section ID and reproduces the data field DF. As a consequence, the first signal recorded in the data field DF is reproduced. By the detection of this first signal, it is detected that the data is recorded not in the particular sector but in the replacement sector, and the position of the replacement sector is found out by the first signal to enable reading the replacement sector.

In this way, a defective sector can be detected in real time in data recording or reproduction, and therefore the replacement of a defective sector is accomplished in a minimal time.

DESCRIPTION OF THE PREFERRED EMBODIMENTS

Figure 1:
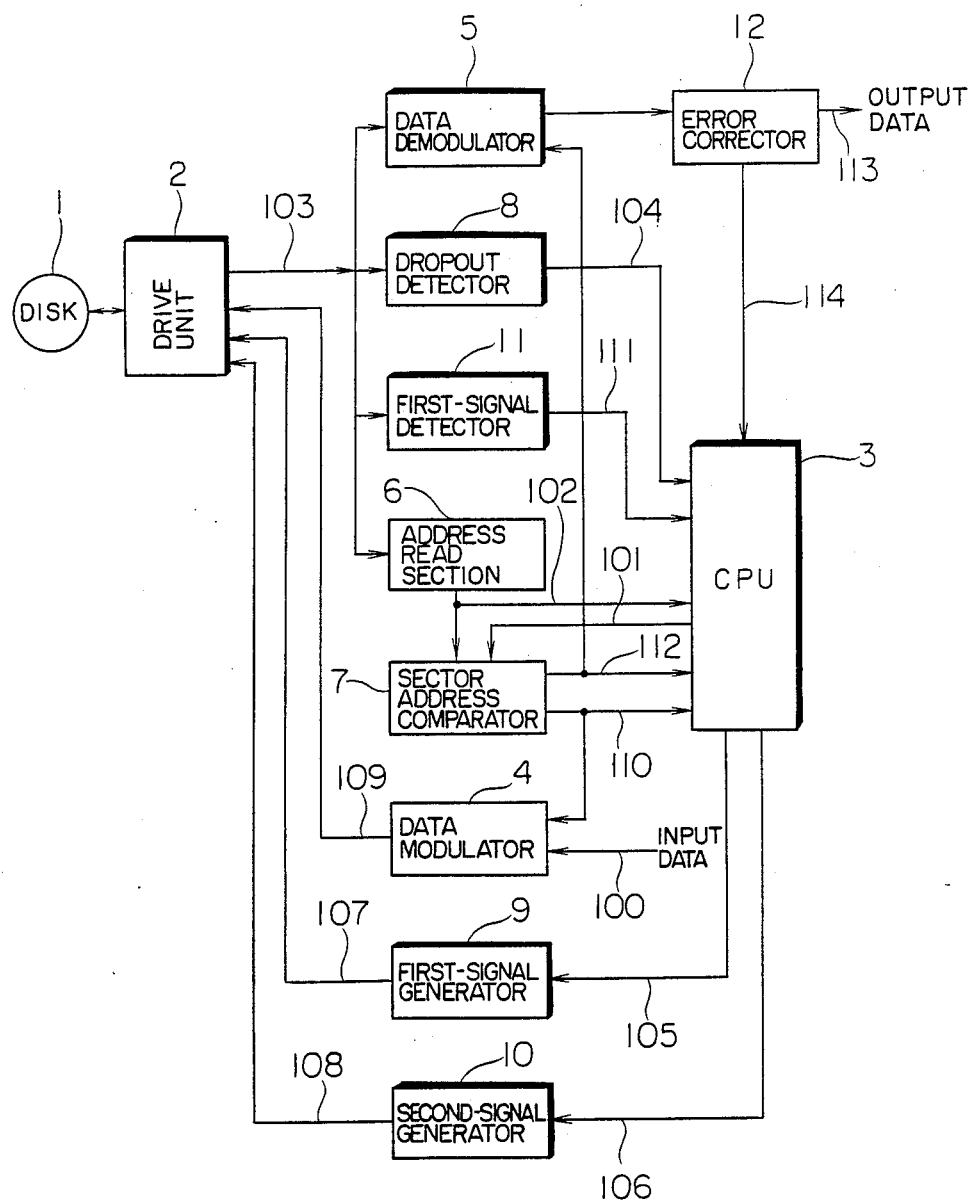
FIG. 1 is a block diagram showing an information recording and reproducing apparatus according to an embodiment of the present invention.

A block diagram of an information recording and reproducing apparatus according to an embodiment of the present invention is shown in FIG. 1. In FIG. 1, reference numeral 1 designates an optical disc having preformatted tracks including a plurality of sectors. Numeral 2 designates a drive unit for retrieving a predetermined track of the optical disc 1 and focussing the laser beam of the optical head on the track thus searched for in order to accomplish a focus tracking servo function precisely following the track for signal recording and reproduction. Numeral 3 designates a microcomputer CPU for controlling systematic operations such as generating a track seek command to the drive section 2, recording and reproducing in a desired sector, writing the first and second signals, detecting the first signal, and replacing a sector. Numeral 4 designates a data modulator for adding to input data 100 an error correction code such as Reed Solomon Code and performing a digital modulation such as MFM modulation or (2, 7) RLLC (run length limited code) modulation in order to produce a modulated signal matching the recording/reproduction characteristics of the recording medium of the optical disc 1. Numeral 5 designates a data demodulator for reproducing the clock pulse from the reproduction signal 103 at a PLO (phase locked loop oscillator), fetching the reproduced signal 103 into a shift register and converting the output of the shift register at a combinational circuit thereby to demodulate the data. The data modulator of (2, 7) RLLC and the data demodulator are disclosed in U.S. Pat. No. 4,115,768 issued on Sept. 19, 1978.

Numeral 6 designates an address read section for reading a track address and a sector address from the sector identification section ID recorded with identification information such as a track address, sector address and CRCC code (cyclic redundancy check. code) for error check, and performing an error check by CRCC. Numeral 7 designates a sector address comparator for comparing an object or target address data 101 from the CPU 3 with a read address 102 of the address read section 6 and detecting the position of the laser beam on the track for detection of a dropout and data recording and reproduction. Numeral 8 designates a dropout detector for converting the reproduced signal 103 reproduced by the drive unit 2 from the optical disc 1 into a binary data by a predetermined clipping level (such as at 50% of the amplitude of the signal 103 reproduced from the sector identification section ID) and detecting a dropout exceeding the clipping level. Numeral 9 designates a first-signal generator for generating to the drive unit 2 a first signal in response to a first-signal wirte command 105 from the CPU 3, numeral 10 a second-signal generator for generating to the drive unit 2 a second signal in response to a second-signal write command 106 from the CPU 3, numeral 11 a firstsignal detector for detecting the first signal recorded in the data field section and notifying the CPU 3, and numeral 12 an error corrector for correcting any error that occurs in the data reproduced from the disc 1 and demodulated in the data demodulator 5. Numeral 100 designates an input data from a host CPU (not shown) to be recorded in the optical disc, numeral 101 a target address data of a sector where the input data is to be recorded and reproduced, numeral 102 an address signal read out from optical disc 1 by the drive unit 2, numeral 103 the signal reproduced from the optical disc 1 by the drive unit 2, numeral 104 the dropout detection signal, numeral 105 the first-signal write command, numeral 106 the second-signal write command. Numeral 107 the first signal, numeral 108 the second signal, numeral 109 the modulated data signal, numeral 110 a write sector gate for ordering the signal write operation of the data modulator 4, numeral 111 the first-signal detection signal, numeral 112 a read sector gate for ordering the signal read operation of the data demodulator 5, numeral 113 an output data read out from the target sector to be transferred to the host CPU, and numeral 114 an error flag for indicating an occurrence of a 1-symbol error or a 2-symbol error led out of the error correction code of the data demodulated from the reproduced signal 103 by the data demodulator 5.

Figure 2:
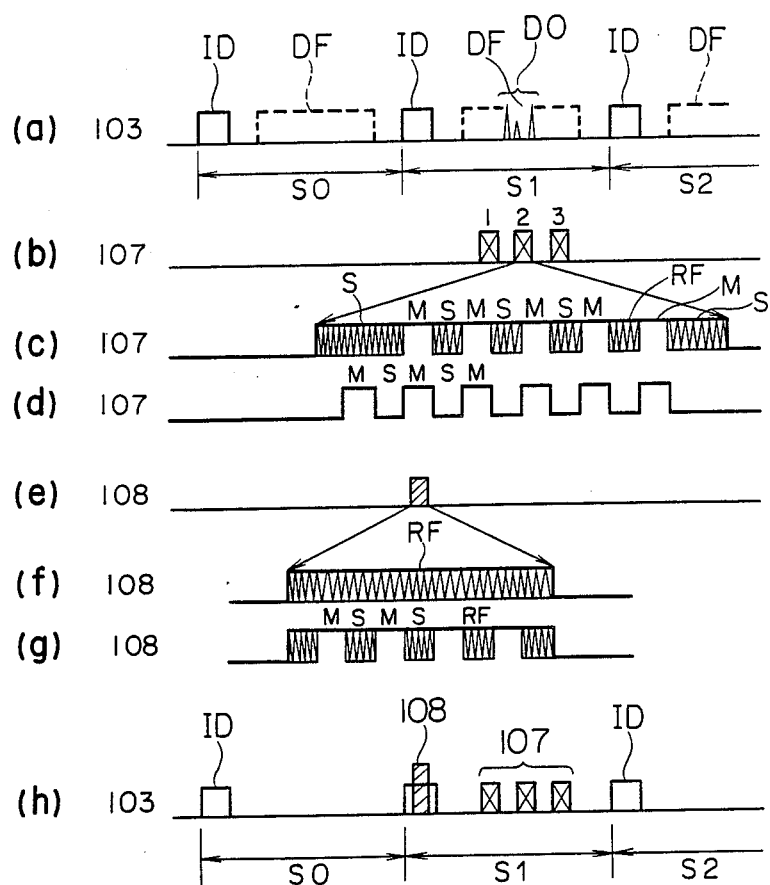
FIGS. 2(a) through 2(h) showing signal waveforms according to the same embodiment.

FIG. 2 shows signal waveforms for explaining the recording operation of the first signal 107 and the second signal 108 in attaching a defect mark to a defective sector. FIG. 2 (a) shows the reproduced signal 103. Sectors S0, S1, S2 each includes a sector identification section ID, a data field section DF and a gap between the sector identification section ID and the data field section DF. A dropout DO exists in the sector S1. An embodiment of the sector identification section ID is shown in FIG. 4.

Figure 3:
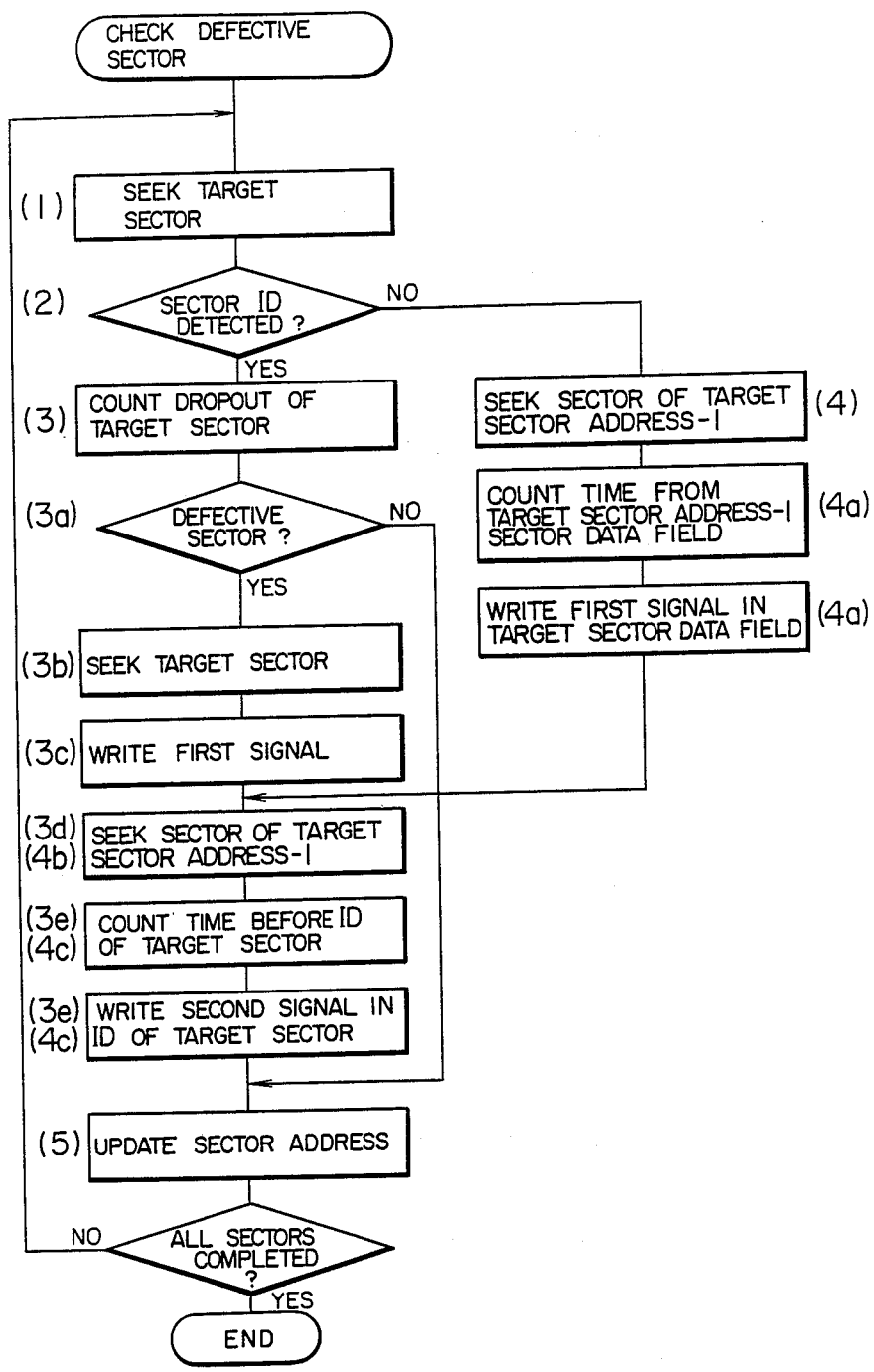
FIG. 3 is a flowchart for checking a defective sector of an optical disc of write-once type.
Figure 4:
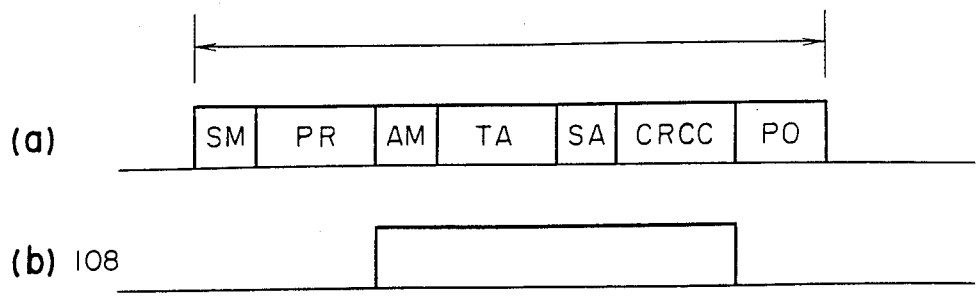
FIGS. 4(a and 4(b) are diagrams showing relative positions of a second signal and an identification section ID.

The relationship between the sector identification section ID and the position of the second signal 108 recorded is shown in FIG. 4. FIG. 4 (a) shows the sector identification section ID, in which SM designates a sector mark indicating the beginning of the sector, PR a preamble for reproducing a clock of the sector identification section ID, AM an address mark for indicating the start of the identification data, TA a track address data, SA a sector address data, CRCC a CRCC code for error detection, and PO a postamble for facilitating the reproduction of the identification data similar to the preamble. The writing position of second signal 108 is shown in FIG. 4 (b). An embodiment of the flowchart for marking a defective sector of an optical disc of write-once type is shown in FIG. 3.

The operation of the information recording and reproducing apparatus embodied as explained above will be described below.

First, explanation will be made of the operation for attaching a defect sector mark for checking whether any selected sector is defective or not before recording of the optical disc 1.

(1) The CPU 3 orders the drive unit 2 to seek any selected target sector of the optical disc 1. The drive unit 2 thus seeks the target sector.

(2) The CPU 3 reads the read-out address signal 102 of the address read section 6 and checks whether it designates the target sector.

(3) Upon detection of the target sector, a possible defect of the reproduced signal 103 of the target sector is checked with the dropout detection signal 104 of the dropout detector 8. The dropout detector 8 includes a comparator circuit supplied with a reference input of a clipping level set to about 50% of the amplitude of the reproduced signal 103 of the sector identification section ID, and detects a signal exceeding the clipping level as a dropout in order for outputting it as a dropout detection signal 104.

(3a) The CPU 3 compares the total number or length of the dropouts of the dropout detection signal 104 with a predetermined criterion, and decides a given sector as defective if a given dropout exceeds the criteria.

(3b) If a sector is found defective based on detection of a dropout exceeding the predetermined criteria, the CPU 3 orders the drive unit 2 to seek a target sector again.

(3c) If the read address signal 102 of the address read section 6 is associated with a target sector, the CPU 3 applies the first-signal write command 105 to the first-signal generator 9 in order to write the first signal 107 having the address of a replacement sector in the data field section DF of the target sector by the drive unit 2.

(3d) The CPU 3, while reading the read address signal 102 of the address read section 6, seeks a sector of which address data is the target sector address minus 1.

(3e) The CUP 3, after timing thru to the sector identification section ID of the target sector, records the second signal 108 just in the sector identification section ID of the target sector. The CPU 3 applies the second-signal write command 106 to the second-signal generator 10 in order to write the second signal 108 in the sector identification section ID of the target sector by the drive unit 2.

(4) In the case where any target sector cannot be detected, on the other hand, the CPU 3 seeks a sector of which address data is the target sector address minus 1 while reading the read address signal 102 of the address read section 6.

(4a) After timing thru to the data field section DF of a target sector, the CPU 3 records the first signal 107 having the address of a replacement sector in the data field section DF of the target sector.

(4b) The CPU 3, while reading the read address signal 102 of the address read section 6, seeks a sector of which address data is the target address minus 1.

(4c) After timing thru up to the sector identification section ID of the target sector, the CPU 3 records the second signal 108 just in the sector identification section ID of the target sector.

(5) The CPU 3 continues to check a predetermined number of sectors while updating the address of the target sector.

FIG. 2 is a diagram showing the manner in which the first signal 107 and the second signal 108 are written in the case where the sector S1 has a dropout DO and is defective. FIG. 2 (a) shows a signal waveform of the reproduced signal 103 of the optical disc 1 having a dropout DO; FIG. 2 (b) an exemplified waveform of the first signal 107; FIG. 2 (c) an enlarged signal waveform of the first signal 107 illustrated in FIG. 2 (b); FIG. 2 (d) a signal waveform of another example of the first second signal 107; FIG. 2 (f) and example of a waveform of the second signal 108 overwritten on the ID section of the defective sector 51; FIG. 2 (f) an enlarged signal waveform of the second signal 108 illustrated in FIG. 2 (e); FIG. 2 (g) another exemplified waveform of the second signal 108, and FIG. 2 (h) a signal waveform of the reproduced signal 103 with a defect mark attached.

As shown in FIG. 2 (c) or 2 (d), the first signal has three pulse trains recorded therein in order that a dropout, if any, may be detected accurately in the optical disc 1. In FIGS. 2 (c), 2 (f) and 2 (g), symbols M, S and RF designate a mark signal, a space signal and an RF (radio frequency) signal respectively. FIGS. 2 (f) and 2 (g) are diagrams showing enlarged waveforms of the second signal 108 illustrated in FIG. 2 (e); FIG. 2 (f) showing an RF signal of almost the same frequency as that of the signal waveform of the sector identification section ID, and FIG. 2 (g) a signal of the same configuration as the first signal 107. As shown in FIG. 4 (b), the signal 108 is written overlapped on at least one of the address mark AM, track address TA, sector address SA and the error check CRCC of the sector identification section ID, thereby causing an address read failure at the address read section 6 and a CRCC error.

The pulse duration of the mark M and space S is sufficiently long as compared with the maximum dot length of the data modulation signal 109 of the data field section DF thereby the assure detection of the fitst signal as described later with reference to FIG. 9.

Figure 5:
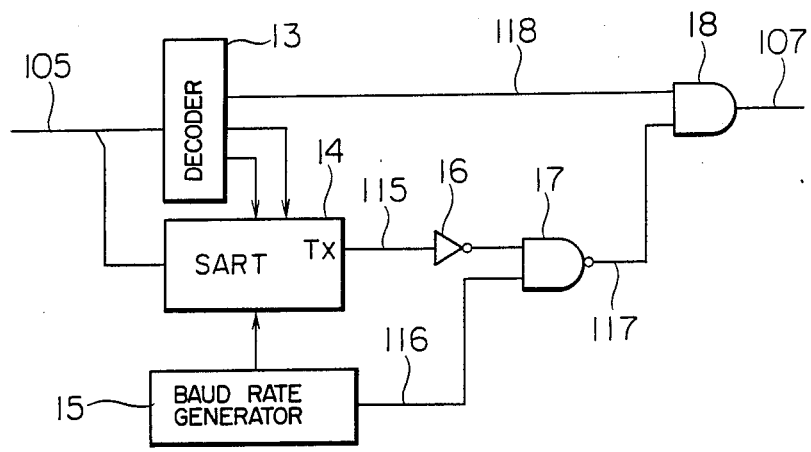
FIG. 5 is a block diagram showing a firstsignal generator.

FIG. 5 shows a block diagram of the first-signal generator 9. In FIG. 5, numeral 13 designates a decoder for decoding the first-signal write command 105, numeral 14 a serial asynchronous data receiver and transmitter SART such as MC6850 of Motorola, numeral 15 a baud rate generator for producing clock pulse, numeral 16 an inverter, numeral 17 a NAND gate, numeral 18 an AND gate, numeral 115 an output signal of the SART 14, numeral 116 an RF signal, numeral 117 an output signal of the NAND gate 17, and numeral 118 a first-signal enable signal.

Figure 6:
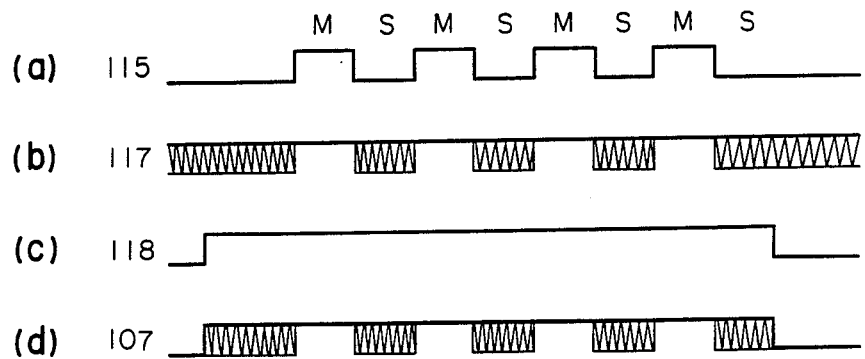
FIGS. 6(a) through 6(d) show signal waveforms generated at various parts in FIG. 5.

FIG. 6 is a diagram showing signal waveforms produced at various parts in FIG. 5, the first-signal write command 105 having the address of a replacement sector is decoded at the decoder 13, and sets the data for setting the mark M and space S of the first signal in the SART 14. Then, upon actuation of the SART 14, the first-signal enable signal 118 is produced from the decoder 13. By doing so, the output signal 115 of the SART 14 is gated with the RF signal 116 at the AND gate 18 to produce the first signal 107. The second-signal generator 10 is capable of generating the first signal shown in FIGS. 2e and (f) from the RF signal 116 and the first-signal enable signal 118 shown in FIG. 5. Also, the second signal shown in FIG. 2 (g) is also capable of being generated on the basis of the data set in the SART 14 in the same configuration as FIG. 5.

Now, the data recording operation will be explained.

Figure 7:
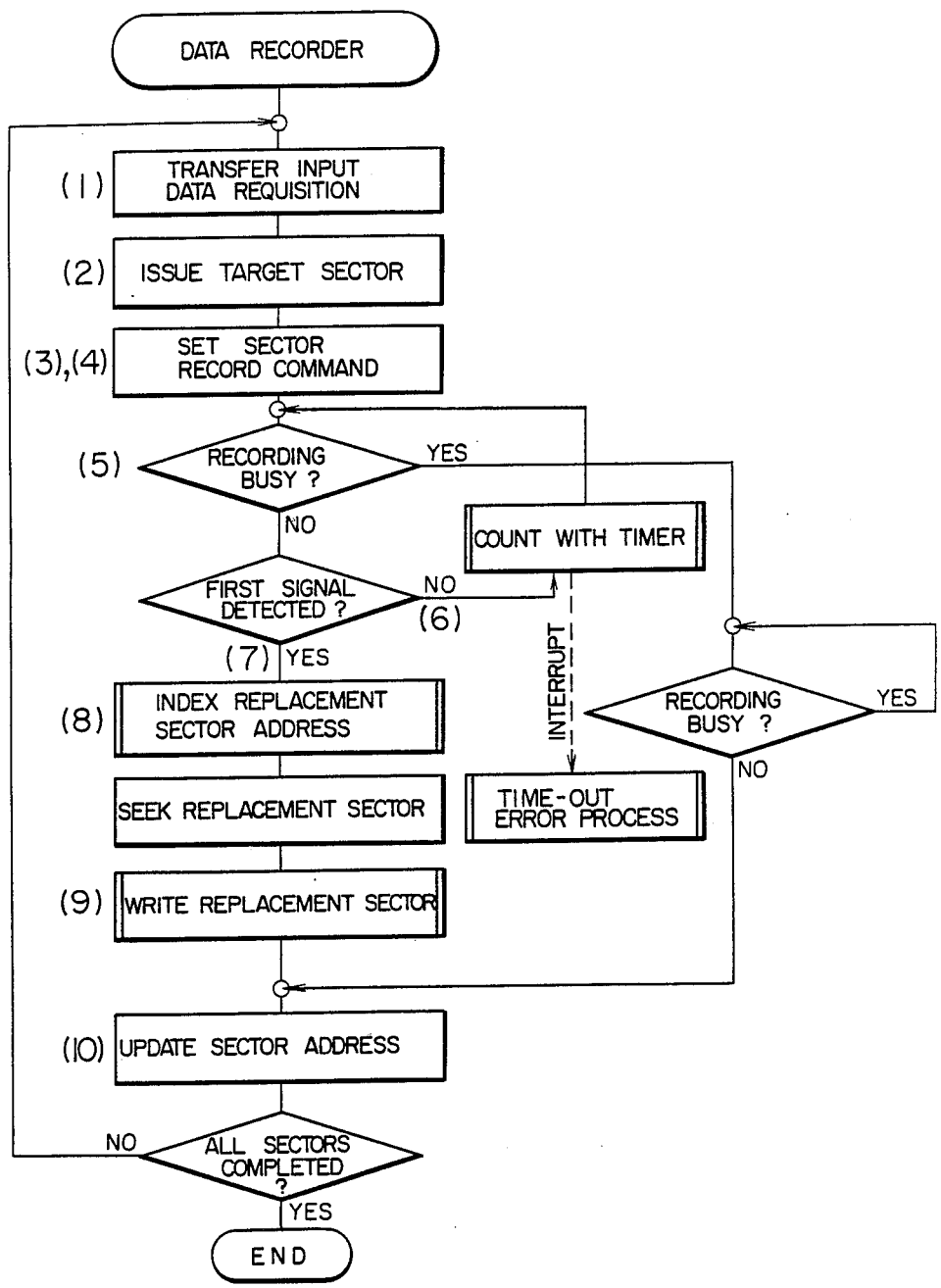
FIG. 7 is a flowchart for recording data in an optical disc with a defect mark.
Figure 8:
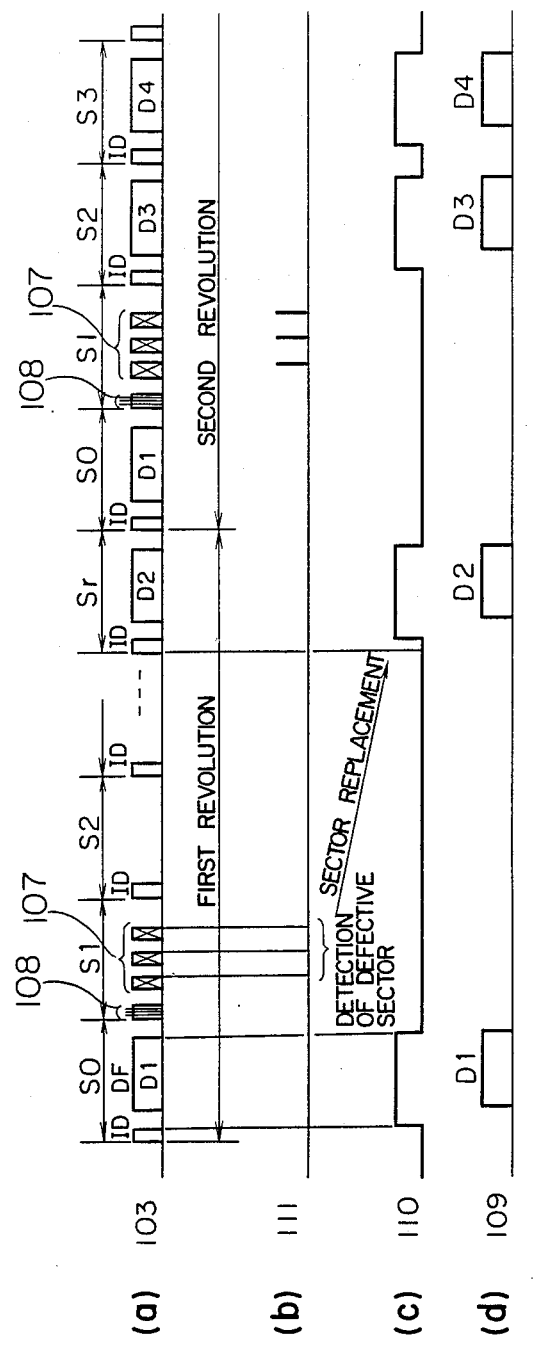
FIGS. 8(a) through 8(d) are diagrams showing signal waveforms produced at various parts at the time of data recording.

FIG. 7 is a flowchart for recording data in the optical disc bearing a defect mark. FIG. 8 is a diagram showing the recording of a replacement sector in place of a sector bearing a defect mark. The data recording operation will be explained with reference to FIG. 7.

(1) The CPU 3 demands inpu data 100 from the host CPU (not shown).

(2) The CPU 3 orders the drive unit 2 to seek a target sector upon receiving the input data 100. The drive unit 2 seeks a target sector.

(3) The CPU 3 sets the target sector data 101 in the sector address comparator 7 and issues a sector record command.

(4) Upon detection of a target sector, the sector address comparator 7 applies a write sector gate 110 to the data modulator 4.

(5) The CPU 3 checks the record busy status of the data modulator 4 and holds the operation thereof until the end of the data recording. The data modulator 4 adds the error correction code to the input data 100, and with digital modulation, applies the data modulation signal 109 to the drive unit 2. The drive unit 2 modulates the laser beam intensity by the modulated data signal 109 and records in the target sector of the optical disc.

(6) If the record busy status fails to be set without detecting the first signal 111 even after the target sector is passed, the CPU 3 detects a time-out error at the time counter and processes the error in the time-out process.

(7) If the first signal 111 is detected without setting the record busy status, the first-signal detector 11 detects the first signal from the reproduced signal 103 and applies it to the CPU 3 as a first-signal detection signal 111. The CPU 3 is informed by the first-signal detection signal 111 that the target sector bears a defect mark, and identifies the address of a replacement sector.

(8) The CPU 3 seeks a replacement sector.

(9) The CPU 3 records the input data in the replacement sector.

(10) The CPU 3 continues to record the data while updating the address of the target sector until the completion of data recording for a predetermined number of sectors.

FIG. 8 shows signal waveforms with data recorded as shown in FIG. 2. FIG. 8 (a) shows the signal 103 reproduced from the optical disc 1 by the drive unit 2, FIG. 8 (b) the first-signal detection signal 111, FIG. 8 (c) the write sector gate 110, and FIG. 8 (d) the data modulation signal 109.

In FIG. 8, the sectors S0, S2 and S3 are normal sectors, and the sector S1 is a sector bearing a defect mark. Since the second signal 108 is written in overwriting manner in the sector identification section ID of the sector S1, the address read section 6 fails to detect the sector identification section ID, so that the laser beam of the drive unit 2 passes the sector identification section ID and the first-signal detector 11 detects the first signal 107 recorded in the data field DF. As a result, the data D2 is recorded in the replacement sector Sr in place of the sector S1 of the same track. A series of these operations are performed during the first rotation of the optical disc 1, followed by the second rotation thereof during which the data D3 and D4 are recorded in the sectors S2 and S3, thus accomplishing the replacement sector recording within a minimum operation time.

Figure 9:
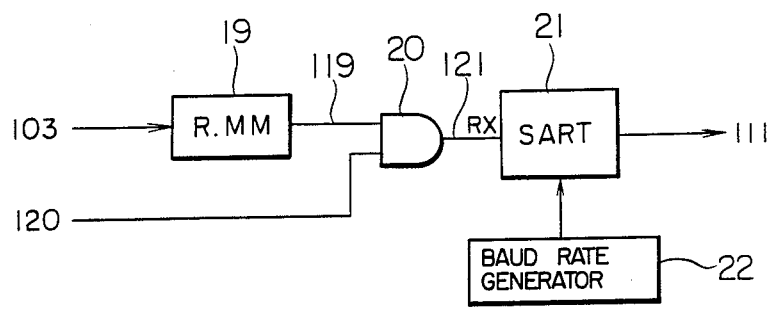
FIG. 9 is a block diagram of a first-signal detector 11.
Figure 10:
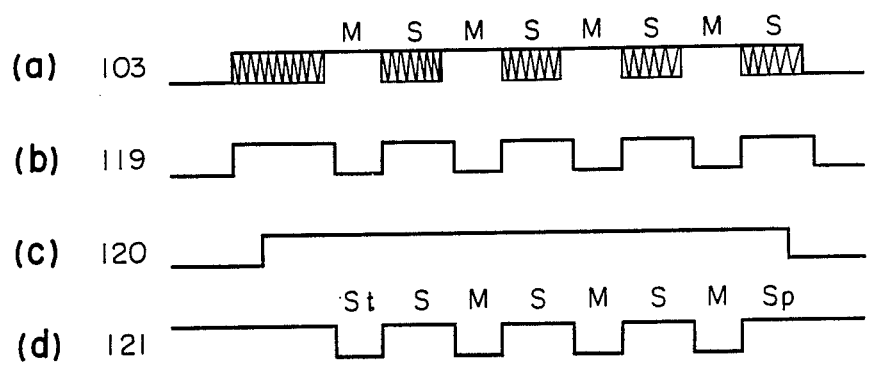
FIGS. 10(a) through 10(d) are diagrams showing signal waveforms generated at various parts of the circuit shown in FIG. 9.

FIG. 9 is a block diagram of the first-signal detector 11. FIG. 10 shows signal waveforms produced in various parts of FIG. 9. In FIG. 9, numeral 19 designates a monostable multivibrator of retrigger type, numeral 20 an AND gate, numeral 21 a SART similar to the part 14, and numeral 22 a baud rate generator similar to the part 15.

Numeral 119 designates an output of the monostable multivibrator of retrigger type 19, numeral 120 the first-signal detection enable signal, and numeral 121 an output of the AND gate.

The operation of the first-signal detector 11 shown in the block diagram of FIG. 9 will be explained below with reference to the signal waveforms illustrated in FIG. 10.

The reproduced signal 103 shown in FIG. 10 (a) is applied to the monostable multivibrator of retrigger type 19 where the envelope thereof is detected by the monostable multivibrator of retrigger type 19 in the manner shown by the output 119 of FIG. 10 (b). The first-signal detection enable signal 120 designates a second-signal recording area of the data field section DF in order to improve the detection accuracy. The output 119 of the monostable multivibrator of retrigger type 19 is gated at the AND gate 20 so that the signal 121 shown in FIG. 10 (d) is applied to the SART 21. The signal 121, like the asynchronous communication interface, is applied as a serial signal to the SART 21, and read by being sampled by a clock pulse from the baud rate generator 22. As shown in FIG. 10 (d), the leading mark M and the last space S function as a start bit St and a stop bit Sp for the SART 21. The combination of the mark M and space S held between the start bit St and stop bit Sp permits the recording of replacement data such as a sector address of the replacement sector.

Figure 11:
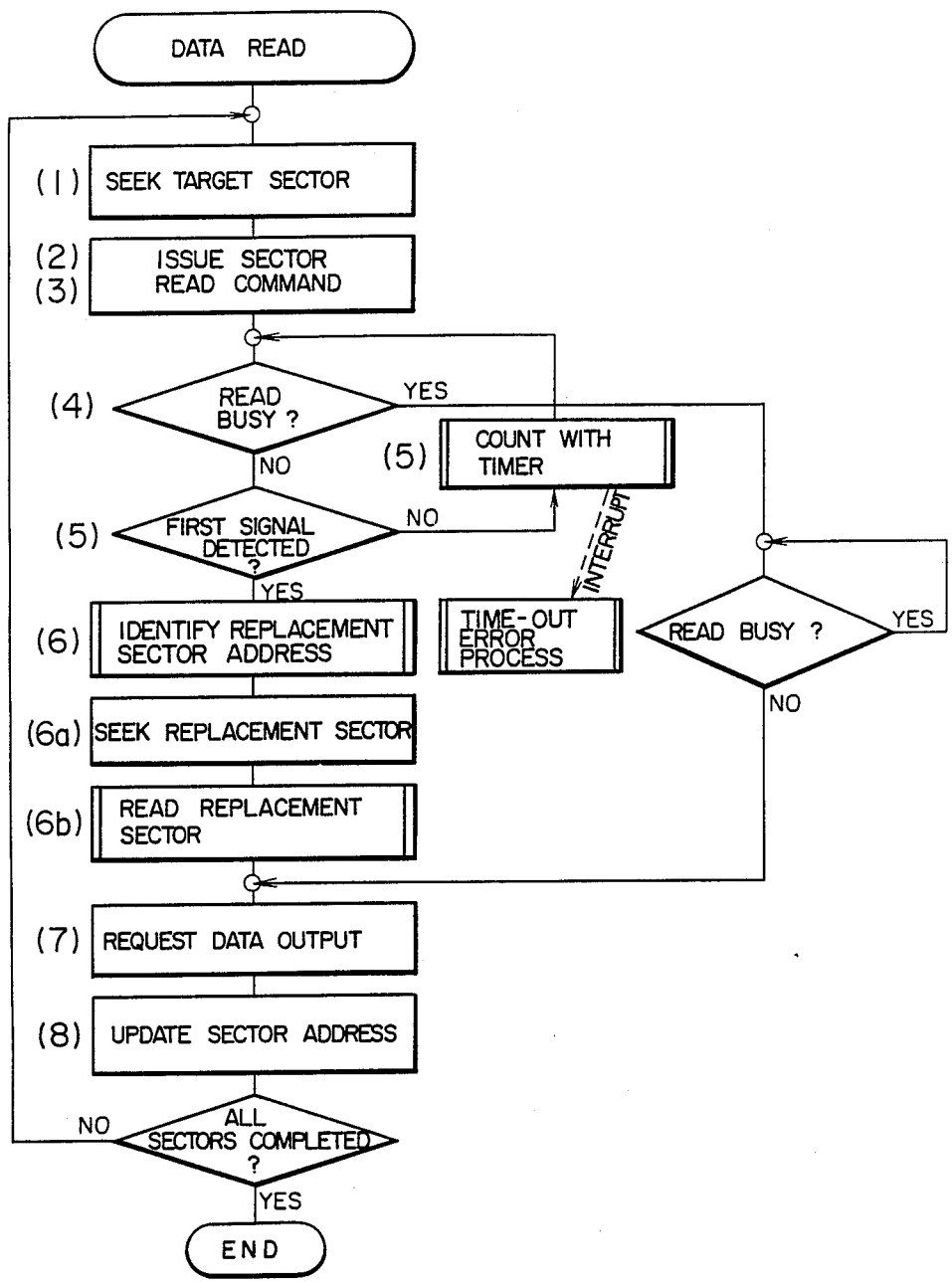
FIG. 11 is a flowchart for reading data from an optical disc with a defect mark.

FIG. 11 shows an embodiment of the data read flowchart for reading the data recorded in the optical disc having a sector bearing a defect mark.

The operation of reading the data recorded in the optical disc bearing the defect mark will be explained below.

(1) The CPU 3 orders the drive unit 2 to seek a target sector.

(2) The CPU 3 sets the target address data 101 in the sector address comparator 7, and issues a sector read command.

(3) Upon detection of the target sector, the sector address comparator 7 applies the read sector gate 112 to the data demodulator 5.

(4) The CPU 3 checks the read busy status of the data demodulator 5, and waits until the data reading is completed. The data demodulated at the data demodulator 5 is corrected the data error occurred in the optical disk by the error corrector 12, and applies the output data 113 to the host CPU.

(5) In the event that the read busy status is not set nor the first signal 111 detected after the target sector is passed, the CPU 3 detects a time out error by timer count and processes an error in the time-out process.

(6) If the first signal 111 is detected without setting the read busy status, on the other hand, the signal detector 11 detects the first signal from the reproduced signal 103, and applies it as the first-signal detection signal 111 to the CPU 3. The CPU 3 is informed by the first signal 111 that the sector under consideration bears a defect mark, and identifies an address of a sector replacing the same.

(6a) The CPU 3 seeks a replacement sector.

(6b) The CPU 3 reads the data from the replacement sector.

(7) The CPU 3 demands that the host CPU produces data, and orders preparation for receiving the next read data.

(8) The CPU 3 continues to read the data while updating the address of the target sector until the data for a predetermined number of sectors are completely read.

As seen from the foregoing description of the data-reading operation, the position of a replacement sector is identified immediately from the sector bearing a defect mark, and therefore a high-speed data reading operation is made possible.

Figure 12:
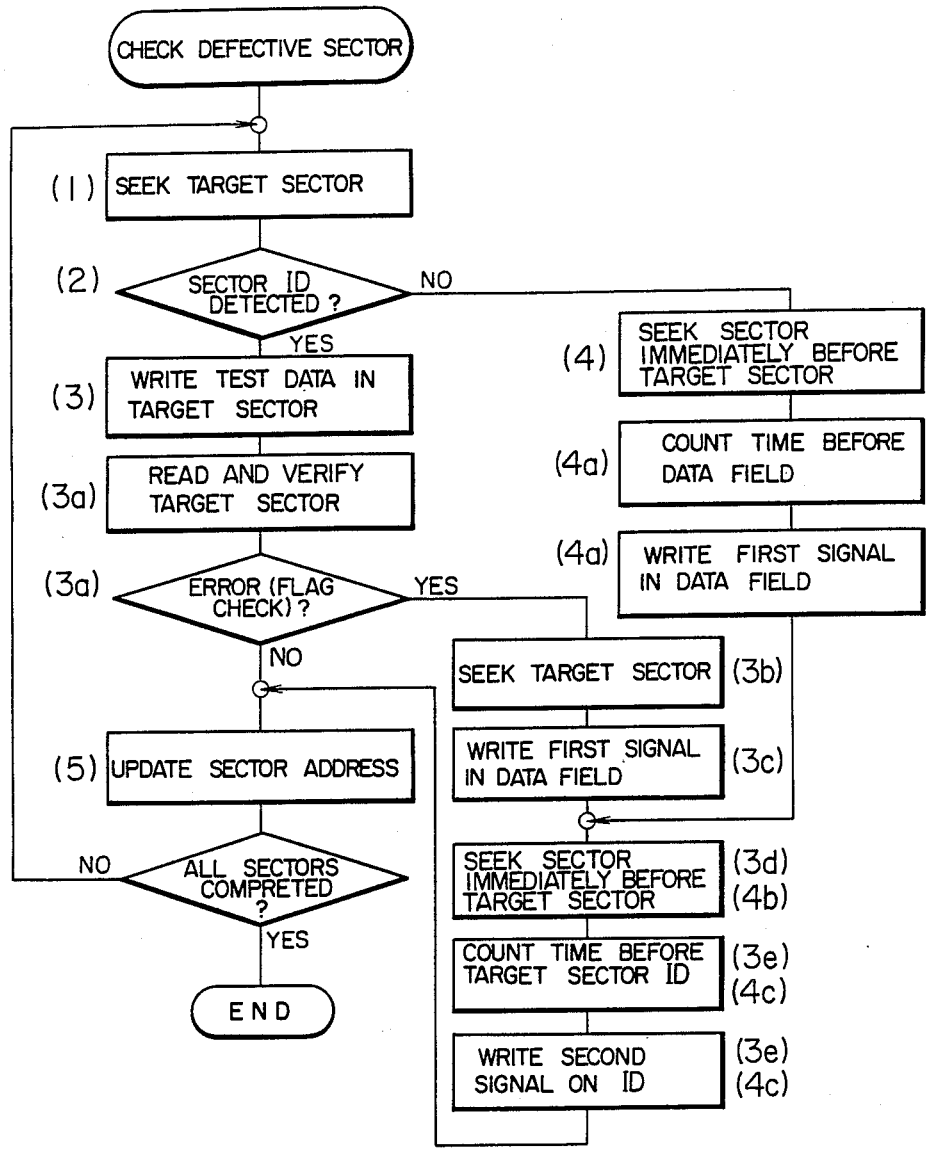
FIG. 12 is a flowchart for checking a defective sector of an optical disc of re-writable type.
Figure 13:
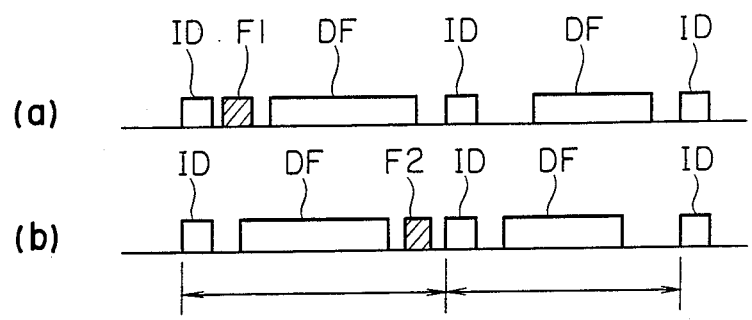
FIGS. 13(a) and 13(b) show a sector format for sector replacement of a conventional disc.

FIG. 12 shows an embodiment of the flowchart for attaching a defect mark in the optical disc of rewritable type.

The attaching will be explained below with reference to FIG. 12.

(1) The CPU 3 orders the drive unit 2 to seeks a target sector of the optical disc 1. The drive unit 2 seeks the target sector.

(2) The CPU 3 reads the read address signal 102 of the address read section 6 and checks whether it is associated with the read target sector.

(3). Upon detection of the target sector, test data for inspection is written in the target sector.

(3a) The CPU 3 performs the read verification of the sector in which the test data has been written. The read verification is performed under the reproduction conditions stricter than normal conditions of the drive unit 2. Specifically, in converting the reproduced signal 103 from the optical disc 1 into a binary value, the clipping level is set to enable easier discrimination of a dropout, and the error corrector 12 calculates an error syndrome of the demodulated data of the data demodulator 5. By this calculation, an error flag 114 is generated, and if there is an error exceeding a criterion predetermined by the CPU 3 from the error flag 114, the sector involved is determined as defective.

(3b) If a sector is found defective, the CPU 3 seeks a target sector again by ordering the drive unit 2 to do so.

(3c) The CPU 3 reads the read address signal 102 of the address read section 6. If the signal 102 is associated with a target sector, the first-signal write command 105 having the address of a replacement sector is applied to the first-signal generator 9, and causes the drive unit 2 to write the first signal 107 in the data field section DF of the target sector.

(3d) The CPU 3 reads the read address signal 102 of the address read section 6, and seeks a sector of the sector address immediately before the target sector address.

(3e) The CPU 3, after counting the time interval up to the sector identification section ID of the target sector, records the second signal 108 just above the sector identification section ID of the target secgor. The CPU 3 applies the second-signal write command 106 to the second signal generator 10, and overwrites the second signal 108 in the sector identification section ID of the target sector by means of the drive unit 2.

(4) In the case where the target sector cannto be detected, the CPU 3 reads the read address signal 102 of the address read section 6, and seeks the sector of a sector address immediately before the target sector address.

(4a) The CPU 3, after counting the time interval before the data field section DF of the target sector, records the first signal 107 in the data field DF of the target sector.

(4b) The CPU 3 reads the read address signal 102 of the address read section 6, and seeks the sector of a sector address immediately before the target sector address.

(4c) The CPU 3, after counting the time interval before the sector identification section ID of the target sector, records the second signal 108 in the sector identification section ID of the target sector.

(5) The CPU 3 continues to check while updating the address of the target sector until the checking of a predetermined number of sectors are completed.

As explained above, in the optical disc of rewritable type, a more accurate sector check than in the optical disc of write-once typd is possible by the check of an error flag at the time of recording and reproduction of test data.

As will be apparent from the foregoing description, according to the present invention, by attaching a defect mark to a sector having such a defect as a dropout in the sector identification section ID or data field section DF thereof, the sector-replacing process is possible within a minimal time without waiting for rotation unnecessarily at the time of data recording or reproduction, so that any sector with a defect mark can be detected with high reliability and a simple configuration. In view of the fact that the first and second signals are recorded overlapped with the data field, the information recording and reproduction apparatus according to the present invention can reduce the loss of the storage capacity of the optical disc in comparison with that according to the conventional method using a flag. The foregoing explanation has been made on an optical disc. Nevertheless, the present invention is applicable with equal effects to magnetic discs or the like and is not limited to them. Further, although the emboiiment described above has the second signal indicating that the sector identification section ID is not detected, it is also possible to use a second signal indicating tat the first signal is recorded in the data field.

What is claimed is:

1. In an information recording and reproduction apparatus comprising an optical disc including a plurality of sectors comprising at least one replacement sector, each of said sectors having a sector identification section ID having address data recorded therein and a data field section DF for recording data, and recording/reproducing means for recording and reproducing data in each of said sectors of the optical disc, the improvement further comprising defective sector marking means including (i) means for detecting a defective sector having a defect in at least one of said sector identification section ID and said data field section DF and generating a defect indicating signal, (ii) means, responsive to said defect indicating signal, for recording a first signal different from the data in the data field section DF of said defective sector independently of whether said defect is in said sector identification section ID or said data field section, DF, (iii) means, responsive to said defect indicating signal, for overwriting a second signal, independently of whether said defect is in said sector identification section ID or said data field section, DF, in the sector identification section ID of said defective sector that causes a read error of the address information, and (iv) means for detecting the first signal recorded in said defective sector and thereafter accessing a replacement sector to enable said recording/reproducing means to record and reproduce data in said replacement sector.

2. The apparatus as in claim 1, wherein said first signal contains information designating said replacement sector and is recorded in the data field section DF of said defective sector.

3. The apparatus as in claim 1 or 2, wherein said first signal has a lower frequency than that of a signal recording data in said data field section DF.

4. The apparatus as in claim 1, further comprising means for detecting a dropout in said data field section DF of an unrecorded one of said sectors, and wherein said means for detectors a defective sector includes means for detecting said unrecorded one of said sectors as a defective sector by detection by said dropout exceeding a predetermined criteria.

5. The apparatus as in claim 1, wherein said data field section DF of said sectors includes rewritable sections, and said apparatus further comprises means for recording and reproducing test data inclusive of error detection and correction codes on and from said sectors, and said means for detecting a defective sector includes means for detecting an error flag exceeding a given criterion from data reproduced by said means for recording and reproducing to determine whether the sector from which said data has been reproduced is a defective sector.

* * * * *